United States Patent

Ozaki

[11] Patent Number: 5,798,750
[45] Date of Patent: Aug. 25, 1998

[54] IMAGE DISPLAY APPARATUS

[75] Inventor: Kazuchika Ozaki, Yokohama, Japan

[73] Assignees: Nikon Corporation, Tokyo; Nikon Systems, Inc., Yokohama, both of Japan

[21] Appl. No.: 870,599

[22] Filed: Jun. 6, 1997

Related U.S. Application Data

[63] Continuation of Ser. No. 532,268, Sep. 22, 1995, abandoned.

[30] Foreign Application Priority Data

Sep. 28, 1994 [JP] Japan ................... 6-233581

[51] Int. Cl.$^6$ ........................................ G09G 5/34
[52] U.S. Cl. ..................... 345/126; 345/173; 345/437
[58] Field of Search ............................... 345/121, 122, 345/123, 125, 126, 165, 146, 156, 173, 179, 437; 382/296; 178/18, 19; 341/22

[56] References Cited

U.S. PATENT DOCUMENTS 4,685,070  8/1987  Flinchbaugh ................. 345/139
5,063,526  11/1991  Kagawa et al. ............... 345/126
5,436,637  7/1995  Gayrand et al. .............. 345/146

*Primary Examiner*—Dennis-Doom Chow
*Attorney, Agent, or Firm*—Shapiro and Shapiro

[57] ABSTRACT

An image display apparatus is provided with a memory for storing electrically converted image information therein, a monitor having an image display area for displaying the image information and at least one display orientation designating area for designating an orientaion of the image, an orientation designating unit for designating the display designating area, a detecting unit for detecting the orientation designated by the designating unit, and an orientation converting unit for converting the image information so that the image information displayed on the image display area may be rotated by a predetermined amount in a direction associated with the orientation detected by the detecting unit, and causing the converted information to be displayed on the image display area of the monitor.

2 Claims, 3 Drawing Sheets

IMAGE DISPLAY APPARATUS

This is a continuation of application Ser. No. 08/532,268 filed Sep. 22, 1995, now abandoned.

BACKGROUND OF THE INVENTION

1. Field of the Invention

This invention relates to an image display apparatus for displaying an image read, for example, by the use of an image reading apparatus on a screen.

2. Related Background Art

In an image reading apparatus, the image of an original is read by the use of an image pickup element comprising a CCD element or the like and this image is displayed on the screen of image display means such as a monitor. Depending on the manner in which the original is placed during reading, the vertical direction and horizontal direction of the image displayed may differ from desired orientations. In such case, it is necessary to rotate the image being displayed so that the orientation of the image may be a desired orientation.

In an apparatus according to the prior art, an operator has indicated the angle of rotation of the image to the image display apparatus, with the orientation of the image being displayed and a desired orientation taken into account. Generally, with rotation in a rightward (clockwise) direction as the reference, a positive angle has been designated when the image is rotated in the rightward direction, and a negative angle has been designated when the image is rotated in a leftward direction. When for example, the vertical direction of the image being displayed is opposite to the desired direction, there will be displayed an image of which the vertical direction has been reversed if 180° or −180° is designated as the angle of rotation. Also, when it is desired to make the left side of the screen upward, 90° can be designated as the angle of rotation, and when it is desired to make the right side of the screen upward, −90° can be designated as the angle of rotation.

In the image display apparatus wherein the angle of rotation is designated as in the prior art, the operator must consider the orientation of the image being displayed and the desired orientation to find the angle of rotation and has been unable to use intuitional judgment. Also, unless the operator correctly grasps the set direction of rotation of the image, he has been liable to cause a wrong operation (wrong setting) in which the image rotates in the opposite direction. If, for example, in spite of the reference of the direction of rotation being set to the rightward direction, the operator designates −90° as the angle of rotation with the intention of making the left side of the screen upward, the right side of the screen will become upward contrary to his expectation.

SUMMARY OF THE INVENTION

It is an object of the present invention to provide an image display apparatus improved in operability when an image is rotated in a desired direction.

To achieve the above object, according to a first aspect of the present invention, there is provided an image display apparatus provided with a memory for storing electrically converted image information therein, a monitor having an image display area for displaying the image information and at least one display orientation designating area for designating an orientation of the image, a detecting unit for detecting the orientation designated by the designating area, and an orientation converting unit for converting the image information so that the image information displayed on the image display area may be rotated by a predetermined amount in a direction associated with the orientation detected by the detecting unit, and causing the converted information to be displayed on the image display area of the monitor.

Preferably, the monitor may have three display direction designating areas located on the left side, the right side and the lower side of the image display area.

According to a second aspect of the present invention, there is provided an image display apparatus capable of changing the orientation of an image to be displayed thereon, and provided with a memory having a plurality of memory areas, each given respective coordinates, and storing a plurality of image data representative of an image in the respective memory areas, a monitor having an image display area having a plurality of pixels corresponding to respective sets of the coordinates and displaying the image, and at least one display orientation designating area for designating an image orientation, an orientation designating unit for designating the designating area, a detecting unit for detecting the orientation designated by the designating unit, and an orientation converting unit for converting the coordinates of the memory areas in conformity with the orientation detected by the detecting unit, and causing the image data from each memory area before the coordinate conversion to be displayed by the pixel corresponding to that memory area after the coordinate conversion.

Preferably, the monitor may have three display direction designating areas located on the left side, the right side and the lower side of the image display area.

The above and other objects, features and advantages of the present invention will be explained hereinafter and may be better understood by reference to the accompanying drawings and the description which follows.

DESCRIPTION OF THE PREFERRED EMBODIMENT

Figure 2:
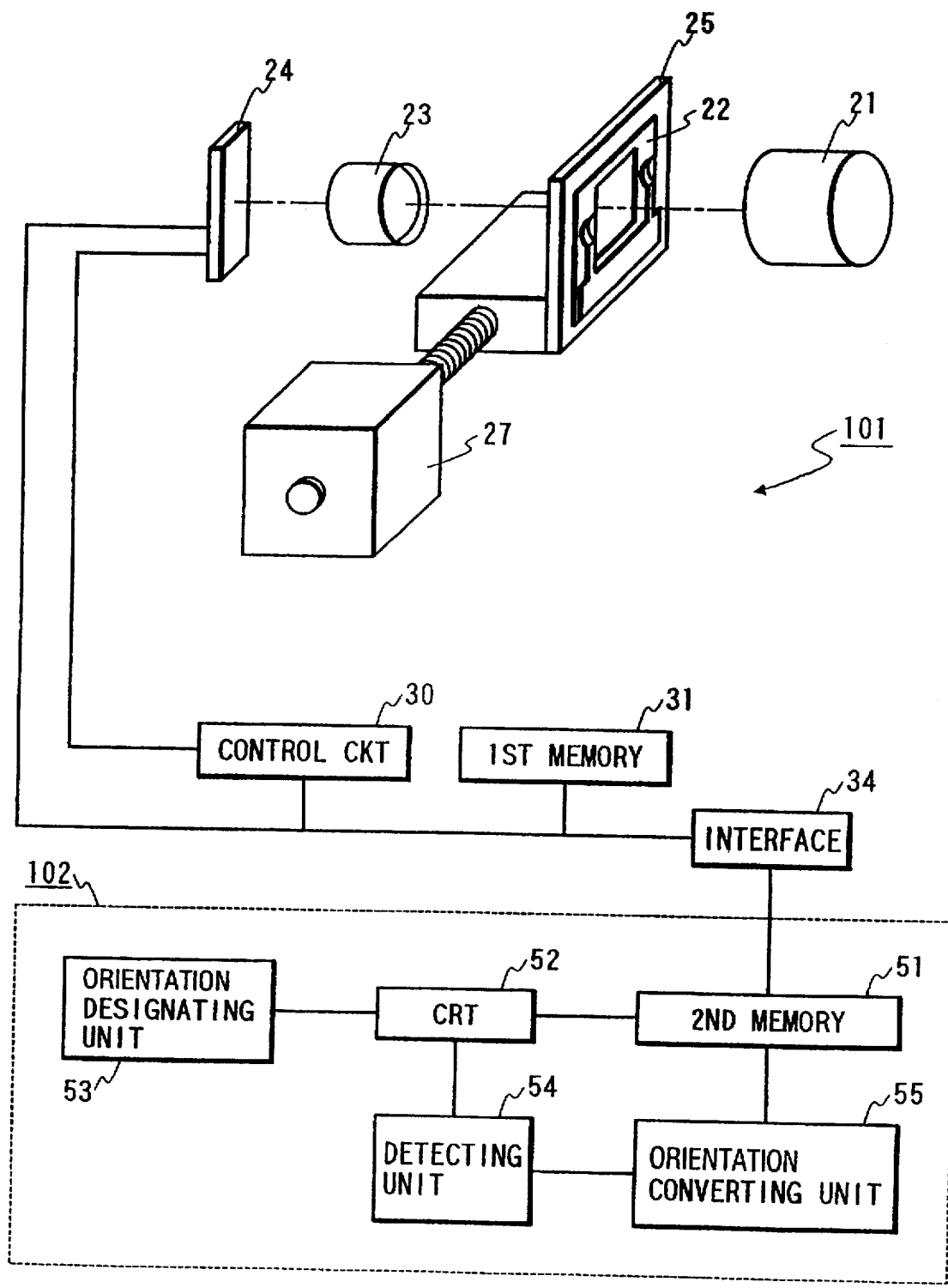
FIG. 2 is a schematic block diagram showing the construction of an embodiment of the present invention.

FIG. 2 is a schematic diagram showing an embodiment of the present invention, and particularly shows the construction of an image reading apparatus 101 for reading an image on a 35 mm film original and an image display apparatus 102 for displaying the image read by the apparatus 101.

The image reading apparatus 101 is provided with a film holder 25 for holding a film original 22, a light source 21 for illuminating the original 22, an image pickup element 24 comprising a linear CCD or the like, an imaging lens 23 and a step motor (stepper motor) 27. The film original 22 held by the film holder 25 is illuminated by the illuminating light source 21. Light transmitted through the original 22 passes through the imaging lens 23 to the light receiving surface of the image pickup element 24, and the image of the film original 22 is formed on this light receiving surface. The film holder 25 is moved in a direction intersecting the optical axis of the illuminating light by the step motor 27. The image pickup element 24 has its main scanning direction disposed in a direction orthogonal to the direction of movement of the film holder 25.

Figure 5:
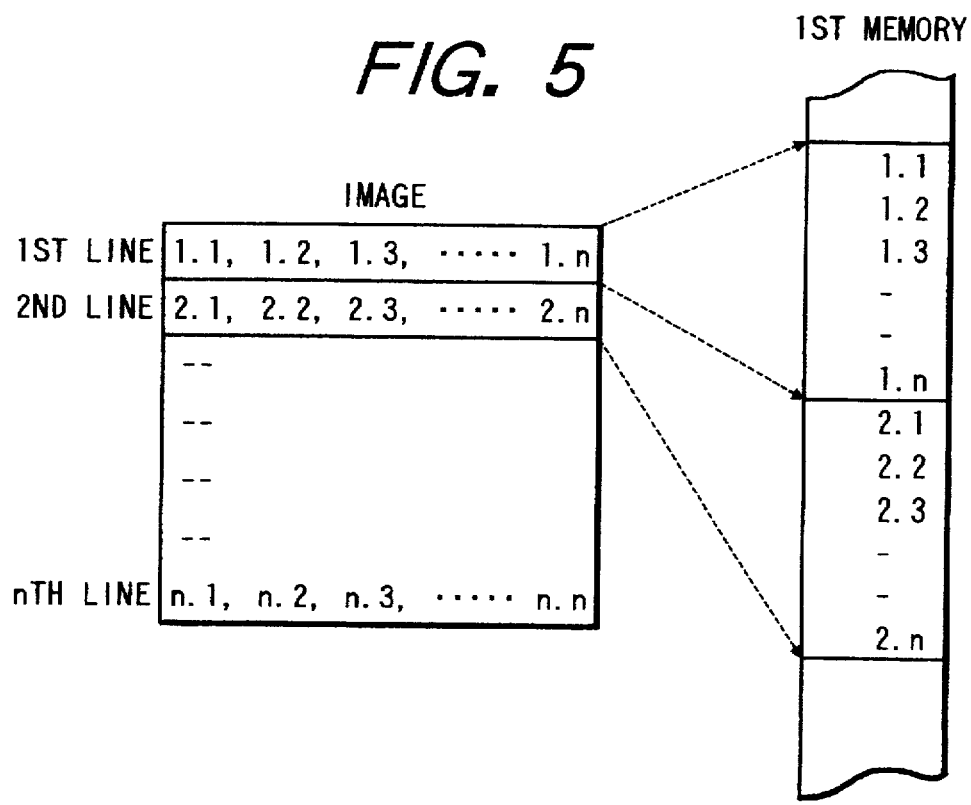
FIG. 5 represents the manner in which image signals are stored in a first memory.

The image reading apparatus 101 also is provided with a control circuit 30, a first memory 31 and an interface 34. The step motor 27 and the image pickup element 24 are controlled by the control circuit 30. The image signal output of the image pickup element 24 is inputted to the control circuit 30 with the positional information of the step motor 27. The control circuit 30 operates the step motor 27 to thereby move the film holder 25 intermittently. The first memory 31, as shown in FIG. 5, stores an image signal output for one line as digital data from the image pickup element 24 for each pixel. It effects this for every line and thereby stores digital data for an image. This data, when required, is outputted to the image display apparatus 102 through the interface 34.

The image display apparatus 102 is provided with a second memory 51 for storing therein the data inputted from the image reading apparatus 101 through the interface 34, a CRT 52 for displaying the data from the memory 51 as an image, an orientation designating unit 53 for designating the display orientation of the image, a detecting unit 54 for detecting the designated display orientation, and an orientation converting unit 55 for converting the orientation of the image in conformity with the designated orientation.

Figure 3:
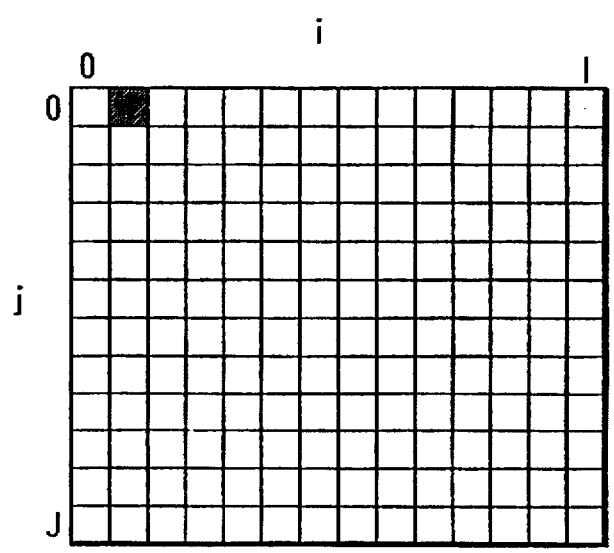
FIG. 3 is a schematic view showing memory areas set in a second memory.

The data stored by the second memory 51 becomes two-dimensional image information obtained by the movement of the film original 22 (film holder 25) and the movement of the image pickup element 24 in the main scanning direction during image reading. The second memory 51 stores the obtained data in two-dimensional arrangement. In this case, i–j coordinates (see FIG. 3) corresponding to the initial position during the reading of the data are set in each memory area of the second memory 51, and each item of data is stored correspondingly to the coordinates. In FIG. 3, there is represented a memory having memory areas corresponding to (I+1)×(J+1) pixels with the left upper portion as the origin (the coordinates of the axes are 0–I and 0–J, respectively). It is to be understood that the data of each pixel in the memory is designated relative to the left upper coordinates in the memory as the origin when the orientation of each pixel during image reading is used as the reference. For example, the data of the pixel in the hatched portion of FIG. 3 is represented as (1, 0) in the i–j coordinates.

Figure 1:
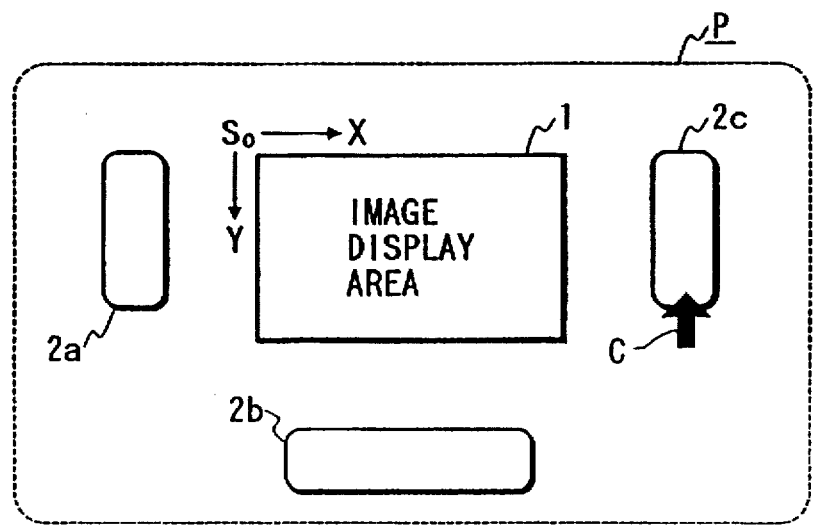
FIG. 1 is a schematic view showing an example of the display screen of an image display apparatus according to the present invention.

The CRT 52 has a display screen P as shown in FIG. 1. An image display area 1 for displaying the data stored in the second memory 51 and display orientation designating area 2a–2c for designating the orientation of the displayed image are set in the display screen P. The image display area 1 is such that a left upper point $S_0$ corresponds to the origin of the i–j coordinates set in the memory area of the second memory 51.

Each display orientation designating area is such that the display position thereof represents a position which becomes the upper side of the screen after the image being displayed is rotated (orientation-converted). In the present embodiment, the designating areas are provided at three locations, i.e., the left side (2a), the right side (2c) and the lower side (2b) of the display area 1. That is, in the display screen P, when it is desired to make the left side of the image the upper side, the area 2a on the left side of the display area 1 is designated, and when it is desired to make the right side of the image the upper side, the area 2c on the right side of the display area 1 is designated. Also, when it is desired to make the lower side of the image the upper side (vertically reverse the image), the area 2b in the lower portion of the display area 1 is designated.

The orientation designating unit 53 has a mechanism (not shown) for moving a cursor C in the display screen P in a desired direction. By this mechanism, an area selected from among the display orientation designating areas 2a–2c provided at the three locations in the display screen P is designated by the cursor. The detecting unit 54 detects which of the three areas in the display screen P is designated by the designating unit 53, and outputs the result of the detection to the orientation converting unit 55. As the designating unit 53 and the detecting unit 54, use can be made of a mechanism similar to a mechanism used in a computer or a word processor to designate a particular position on a screen by a cursor moved on the screen by the operation of a keyboard or a mouse. It is also possible to use a touch-sensitive screen, whereby the operator can touch the display direction designating area with a finger, a sensor or the like to designate a particular position on the screen. FIG. 1 shows a state in which the display orientation designating area 2c has been designated (clicked) by the use of the cursor.

The orientation converting unit 55 converts the coordinates of the data in the memory 51 so that the data (image information) displayed on the image display area 1 may be rotated by a predetermined amount in a orientation associated with the direction designated by the detecting unit 54. On the basis of the converted coordinates (hereinafter referred to as the conversion coordinates), the data (image) is displayed on the image display area 1 through the CRT 52.

Description will now be made of the process of conversion of the orientation of the image in the image display apparatus 102 of the present embodiment. The image display apparatus 102, when it displays the data read by the image reading apparatus 101, inputs the data of the original from the first memory 31 of the reading apparatus 101 through the interface 34. The inputted data is stored in the second memory 51 in two-dimensional arrangement. The CRT 52 receives the data of the second memory 51 and displays it on the image display area 1 of the display screen P. At this time, the data of coordinates in each line (for each value of j) are read in succession from i=0 to i=I, proceeding sequentially from the line j=0 to the line j=J, from the i–j coordinates of the second memory 51, and the data are outputted to the CRT 52. In the present embodiment, assuming that a memory corresponding to 100×100 pixels is set, the maximum pixel numbers I and J in the respective axis directions are 99 each (i=I=99, j=J=99). As previously described, the data of each pixel in the memory is designated relative to the left upper coordinates of the memory area in which the respective data are stored, with the orientation of each pixel during image reading as the reference. Therefore, the data of 100 coordinates (0, 0), (1, 0), (2, 0), . . . , (99, 0) are successively read at first. When i has reached the position (i=99) of I, the data of coordinates in which 1 has again been added to i in succession from i=0 are read in the line of (j=1), for which 1 has been added to j. That is, the data of 100 coordinates (0, 1), (1, 1), (2, 1), . . . , (98, 1), (99, 1) are read. Thereafter, in a similar manner, 1 is added to j each time i assumes the maximum number I, and the reading of the data is effected until i assumes the position of the maximum number in the line (j=99) in which j has reached J. In the last line (j=99), the data of coordinates (0, 99), (1, 99), (2, 99), . . . , (98, 99), (99, 99) are read.

Supposing XY coordinates having the point $S_0$ as shown in FIG. 1 as the origin, the image display area 1 displays the data outputted from the second memory 51, on the basis of the value of the aforementioned coordinates. Usually, the data for the first one line read and outputted by the second memory 51 is displayed along the direction of the X-axis from the origin. The data for the second line outputted from the second memory 51 is displaced at a position deviated by one line in the direction of the Y-axis from the previously displayed location. Thereafter, in a similar manner, the data for the remaining lines outputted from the second memory 51 are successively displayed, with the data for each line being deviated by one line from that of the preceding line in the direction of the Y-axis.

Description will now be made of a case where the image displayed on the image display area 1 is rotated in a designated direction. (1) A case where the image is rotated by 90° in a clockwise direction.

The display orientation designating area 2a on the left side of the image display area 1 is first designated by the use of the designating unit 53. The detecting unit 54 detects that the designating area 2a has been designated, whereupon it outputs that information to the converting unit 55. The orientation converting unit 55 inputs the respective data stored in the second memory 51, and converts the coordinates of the respective inputted data so that the image displayed on the image display area 1 will be rotated by 90° in a clockwise direction on the basis of the information detected by the detecting unit 54.

When the image being displayed is to be rotated by 90° in the clockwise direction, the direction converting unit 55 sets a calculation for coordinates conversion so that the coordinates (i, j) of the inputted data may become (I-j, i). Here, I and J are the maximum pixel number of in the direction of the i-axis and the maximum pixel number of in the direction of the j-axis, respectively. As previously described, the direction converting unit 55 first inputs the data of the coordinates (0, 0), (1, 0), . . . , (98, 0), (99, 0) of the line of (j=0). Then, it converts the coordinates of the inputted data on the basis of the aforementioned calculation. The coordinates after the conversion of these data (the conversion coordinates) are (99, 0), (99, 1), . . . , (99, 98), (99, 99). At this time, the data corresponding to each pixel in the conversion coordinates are rotated by 90° in the clockwise direction. Thus, when the orientation of each pixel during image reading is used as the reference, the respective data are designated relative to the right upper coordinates in the conversion coordinates. Thereafter, with respect to the line of (j=1), the orientation converting unit 55 inputs from the second memory 51 the data of coordinates in which 1 has again been added to i in succession from i=0. That is, it inputs the data of 100 coordinates (0, 1), (1, 1), . . . , (98, 1), (99, 1) in succession and converts the coordinates of the respective data into conversion coordinates on the basis of the aforementioned calculation. In this case, the conversion coordinates of the respective data are (98, 0), (98, 1), . . . , (98, 98), (98, 99). Thereafter, in a similar manner, 1 is added to j each time i reaches the position (i=99) of I, and the data of the respective coordinates are inputted until i becomes maximum in a line (j=99) in which j has reached J. The respective inputted data are converted into conversion coordinates. When j reaches J, the data of the coordinates (0, 99), (1, 99), . . . , (98, 99), (99, 99) in the second memory 51 are outputted to the converting unit 55, and are converted thereby into conversion coordinates (0, 0), (0, 1), . . . , (0, 98), (0, 99). The direction converting unit 55 outputs to the second memory 51 the conversion coordinates obtained by the calculating process as described above, with the data corresponding to the coordinates, and substitutes them for the data of the coordinates before conversion.

Figure 4A:
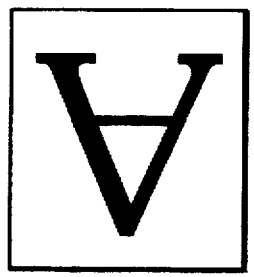
FIGS. 4A to 4D are schematic views showing images displayed on the image display area of the display screen.
Figure 4B:
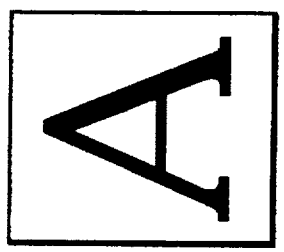

When the data in the second memory 51 are converted into conversion coordinates by the orientation converting unit 55, the CRT 52 reads the respective data in the same order as before the conversion (the order of the coordinates (0, 0), (1, 0), . . . , (98, 99), (99, 99) after conversion). The respective read data are displayed on the image display area 1 of the display screen P in accordance with the conversion coordinates. Thereby, the image displayed on the image display area 1 in the state of FIG. 4A before the conversion is rotated by 90° in the clockwise direction and displayed as shown in FIG. 4B. (2) A case where the image is rotated by 180° (inverted)

The display orientation designating area 2b on the lower side of the image display area 1 is designated by the use of the orientation designating unit 53. The detecting unit 54, when it detects that the display direction designating area 2b has been designated, outputs that information to the orientation converting unit 55. The converting unit 55 inputs the respective data stored in the second memory 51, and converts the coordinates of the respective inputted data so that the image displayed on the image display area 1 will be rotated by 180° on the basis of the information detected by the detecting unit 54.

When the image being displayed is to be rotated by 180° in the clockwise, the converting unit 55 sets a calculation for coordinates conversion so that the coordinates (i, j) of the inputted data may be (I-i, J-j). I and J are the maximum pixel number in the direction of the i-axis and the maximum pixel number in the direction of the j-axis, respectively. Thereafter, as previously described, the orientation converting unit 55 first inputs the data of the coordinates (0, 0), (1, 0), . . . , (98, 0), (99, 0) of the line of (j=0). Then, it converts the coordinates of the respective inputted data on the basis of the aforementioned calculation. (conversion coordinates) are (99, 99), (98, 99), . . . , (1, 99), (0, 99). At this time, the data corresponding to each pixel in the conversion coordinates is rotated by 180° (inverted). Thus, when the orientation of each pixel during image reading is the reference, the respective data are designated relative to the right lower coordinates in the conversion coordinates. Next, the orientation converting unit coordinates. Thereafter, the direction converting unit 55 inputs from the second memory 51 the data of coordinates in which, with respect to the line of (j=1), 1 has again been added to i in succession from i=0. That is, it inputs the data of 100 coordinates (0, 1), (1, 1), . . . , (98, 1), (99, 1) and converts the coordinates of the respective data into conversion coordinates on the basis of the aforementioned calculation. In this case, the conversion coordinates of the respective data are (99, 98), (98, 98), . . . , (1, 98), (0, 98). Thereafter, in a similar manner, 1 is added to j each time i reaches the position (i=99) of I, and the data of the respective coordinates are inputted until i becomes maximum in the line (j=99) in which j has reached J. The respective inputted data are converted into conversion coordinates. When j reaches J, the data of the coordinates (0, 99), (1, 99), . . . , (98, 99), (99, 99) in the second memory 51 are outputted to the converting unit 55, whereby they are converted into conversion coordinates (99, 0), (98, 0), (1, 0), (0, 0). The converting unit 55 outputs to the second memory 51 the conversion coordinates obtained by the calculating process as described above, with the data corresponding to those coordinates, and substitutes them for the data of the coordinates before conversion.

Figure 4C:
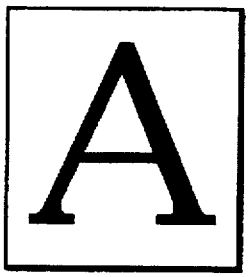

When the data in the second memory 51 are converted into conversion coordinates by the converting unit 55, the CRT 52 reads the respective data in the same order as before the conversion (the order of the coordinates (0, 0), (1, 0), . . . , (98, 99), (99, 99) after conversion. Then, it displays the respective read data on the image display area 1 of the display screen P in accordance with the conversion coordinates. Thereby, the image displayed on the image display area 1 in the state of FIG. 4A before the conversion is rotated by 180° (inverted) and displayed as shown in FIG. 4C. (3) A case where the image is rotated by 90° in a counter-clockwise direction The display orientation designating area 2c on the right side of the image display area 1 is first designated by the use of the designating unit 53. The detecting unit 54, when it detects that the designating area 2c has been designated outputs that information to the orientation converting unit 55. The converting unit 55 inputs the respective data stored in the second memory 51, and converts the coordinates of the respective inputted data so that the image displayed on the image display area 1 will be rotated by 90° in a counter-clockwise direction on the basis of the information detected by the detecting unit 54.

When the image being displayed is to be rotated by 90° in the counter-clockwise direction, the converting unit 55 sets a calculation for coordinates conversion so that the coordinates (i, j) of the inputted data may be (j, J–i). Here, I and J are the maximum pixel number in the direction of the i-axis and the maximum pixel number in the direction of the j-axis, respectively. Thereafter, as previously described, the converting unit 55 first inputs the data of the respective coordinates (0, 0), (1, 0), . . . , (98, 0), (99, 0) in the line of (j=0). Then, it converts the coordinates of the respective inputted data on the basis of the aforementioned calculation. The coordinates of these data after conversion (conversion coordinates) are (0, 99), (0, 98), . . . , (0, 1), (0, 0). At this time, the data corresponding to the respective pixels in the conversion coordinates are rotated by 90° in the counter-clockwise direction. Thus, when the direction of each pixel during image reading is the reference, the respective data are designated relative to the left lower coordinates in the conversion coordinates. Next, the converting unit 55 inputs from the second memory 51 the data of coordinates in which, with respect to the line of (j=1), 1 has again been added to i in succession from i=0. That is, it inputs the data of 100 coordinates (0, 1), (1, 1), . . . , (98, 1), (99, 1) and converts the coordinates of the respective data into conversion coordinates on the basis of the aforementioned calculation. In this case, the conversion coordinates of the respective data are (1, 99), (1, 98), . . . , (1, 1), (1, 0). Thereafter, in a similar manner, 1 is added to j each time i reaches the position (i=99) of I, and the data of the respective coordinates are inputted until i becomes maximum in the line (j=99) in which j has reached J. The respective inputted data are then converted into conversion coordinates. When j reaches J, the data of the coordinates (0, 99), (1, 99), . . . , (98, 99), (99, 99) in the second memory 51 are outputted to the converting unit 55, whereby they are converted into conversion coordinates (99, 99), (99, 98), . . . , (99, 1), (99, 0). The converting unit 55 outputs to the second memory 51 the conversion coordinates obtained by the calculating process as described above, with the data corresponding to those coordinates, and substitutes them for the data of the coordinates before conversion.

Figure 4D:
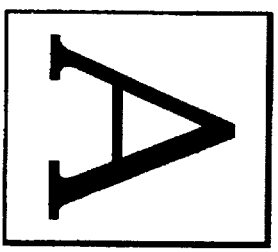

When the data in the second memory 51 are converted into conversion coordinates by the converting unit 55, the CRT 52 reads the respective data in the same order as before the conversion (the order of the coordinates (0, 0), (1, 0), . . . , (98, 99), (99, 99) after conversion). Then, it displays the respective read data on the image display area 1 of the display screen P in accordance with the conversion coordinates. Thereby, the image displayed on the image display area 1 in the state of FIG. 4A before the conversion is rotated by 90° in the counter-clockwise direction and displayed as shown in FIG. 4D.

While in the present embodiment, the directions of rotation of the image have been set to three directions, i.e., 90° in the clockwise direction, 90° in the counter-clockwise direction and vertical reversal, this is not restrictive. If a display orientation designating area is provided at a location on the display screen which corresponds to a desired angle of rotation, it will be possible to designate other angles of rotation including 45° and 60°, for example.

Also, the present embodiment is constructed such that the image data obtained by the image reading apparatus is stored in the memory (the second memory) through the interface, but the present invention is not restricted to such a construction. In the case of an image display apparatus for displaying image information recorded on a memory medium such as a floppy disc or a CD-ROM, a mechanism for reproducing the information on the memory medium can be provided so that data obtained by this reproducing mechanism may be stored by the memory.

Those of ordinary skill in the art will appreciate that other variations may be constructed in keeping with the principles of the present invention, the scope of which is defined in the appended claims.

What is claimed is:

1. An image display apparatus comprising:

a memory for storing electrically converted image information therein;

a monitor having an image display area for displaying an image based on said image information and at least three display orientation designating areas for designating display orientation of the image;

a detector for detecting the designated orientation;

an orientation converting device for converting said image information to conform with an orientation in which the image is rotated, about an axis perpendicular to said image display area, by a predetermined amount in a direction associated with the orientation detected by said detector, and for causing the image to be displayed on said image display area based on the converted image information, wherein said three display orientation designating areas are located respectively on a left side, a right side, and a lower side of said image display area, at respective positions each associated with a different rotational orientation of the image about said axis, for designating the associated orientation.

2. An image display apparatus capable of changing an orientation of an image to be displayed thereon, said apparatus comprising:

a memory having a plurality of memory areas, each assigned a respective set of coordinates, and storing a plurality of image data representative of the image in the respective memory areas;

a monitor including an image display area having a plurality of pixels corresponding to respective sets of said coordinates for displaying said image, and at least three display orientation designating areas for designating rotational orientation of the image about an axis perpendicular to said image display area;

a detector for detecting the designated orientation; and an orientation converting device for converting the coordinates of said memory areas in accordance with the orientation detected by said detector, and for causing the image data from each memory area before conversion of the coordinates to be displayed by the pixel corresponding to the coordinates of that memory area after the conversion, wherein said three display orientation designating areas are provided at different sides of said image display area; at respective positions each associated with a different rotational orientation of the image about said axis, for designating the associated orientation.

* * * * *